United States Patent
Harunari

(10) Patent No.: US 8,763,741 B2
(45) Date of Patent: Jul. 1, 2014

(54) VEHICLE BODY REAR PORTION STRUCTURE

(75) Inventor: Eiji Harunari, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 100 days.

(21) Appl. No.: 13/641,537

(22) PCT Filed: Mar. 7, 2011

(86) PCT No.: PCT/JP2011/055196
§ 371 (c)(1), (2), (4) Date: Oct. 16, 2012

(87) PCT Pub. No.: WO2011/148687
PCT Pub. Date: Dec. 1, 2011

(65) Prior Publication Data
US 2013/0037338 A1    Feb. 14, 2013

(30) Foreign Application Priority Data

May 26, 2010   (JP) ................................. 2010-120846

(51) Int. Cl.
*B60R 16/04*   (2006.01)
*H01M 2/10*   (2006.01)

(52) U.S. Cl.
CPC ............. *B60R 16/04* (2013.01); *H01M 2/1083* (2013.01)
USPC ...................................................... 180/68.5

(58) Field of Classification Search
CPC .............................. B60R 16/04; H01M 2/1083
USPC ................................................ 180/65.1, 68.5
See application file for complete search history.

(56) References Cited

U.S. PATENT DOCUMENTS 6,988,575 B2 *   1/2006   Takedomi et al. ............ 180/68.5
7,004,274 B2 *   2/2006   Shibasawa et al. .......... 180/68.5
(Continued)

FOREIGN PATENT DOCUMENTS

JP   2511208 Y2   9/1996
JP   10-203415 A   8/1998
(Continued)

OTHER PUBLICATIONS

International Search Report for Application No. PCT/JP2011/055196 dated Apr. 19, 2011.

*Primary Examiner* — Hau Phan
*Assistant Examiner* — Jacob Meyer
(74) *Attorney, Agent, or Firm* — Lerner, David, Littenberg, Krumholz & Mentlik, LLP

(57) ABSTRACT

A vehicle body rear portion structure which can improve the operability of a coupling operation between a flange which extends downward from a peripheral portion of a parcel shelf and an upper end portion of a battery cover is provided. A battery 1 is mounted on a rear side of a seatback, a battery cover 5 which covers at least a rear surface of the battery 1 is provided, a parcel shelf 6 which extends to a vehicle rear side Rr from an upper end portion side of the seatback to cover an upper side of the above battery 1 is provided, a flange 16 which extends downward from a peripheral portion of the parcel shelf 6 and an upper end portion of the above battery cover 5 are coupled together by a coupling member, a retainer is mounted on the flange 16 of the parcel shelf 6 at an interval from a flange surface of the flange 16, and the flange 16, the upper end portion of the battery cover 5, and the retainer are coupled together by the coupling member 23 while the upper end portion of the battery cover is inserted between the flange 16 and the retainer.

8 Claims, 8 Drawing Sheets

(56) References Cited

U.S. PATENT DOCUMENTS

| | | | |
|---|---|---|---|
| 7,021,412 B2* | 4/2006 | Koike et al. | 180/68.5 |
| 7,025,160 B2* | 4/2006 | Awakawa | 180/68.5 |
| 7,654,351 B2* | 2/2010 | Koike et al. | 180/68.5 |
| 7,690,464 B2* | 4/2010 | Yustick et al. | 180/68.5 |
| 7,690,686 B2* | 4/2010 | Hashimura et al. | 280/782 |
| 8,037,960 B2* | 10/2011 | Kiya | 180/68.5 |
| 8,051,934 B2* | 11/2011 | Kiya et al. | 180/68.5 |
| 8,430,194 B2* | 4/2013 | Yamatani | 180/68.1 |
| 8,453,778 B2* | 6/2013 | Bannier et al. | 180/68.5 |
| 8,584,779 B2* | 11/2013 | Tsuchiya et al. | 180/68.5 |
| 2003/0067747 A1* | 4/2003 | Hasegawa et al. | 361/695 |
| 2003/0089540 A1* | 5/2003 | Koike et al. | 180/68.5 |
| 2003/0095382 A1* | 5/2003 | Takedomi et al. | 361/688 |
| 2003/0098191 A1* | 5/2003 | Takedomi et al. | 180/68.5 |
| 2003/0186115 A1* | 10/2003 | Shibasawa et al. | 429/100 |
| 2005/0205316 A1* | 9/2005 | Yamafuji | 180/68.5 |
| 2007/0238015 A1* | 10/2007 | Kubota et al. | 429/120 |
| 2011/0139527 A1* | 6/2011 | Bannier et al. | 180/68.5 |
| 2012/0031695 A1* | 2/2012 | Tsuchiya et al. | 180/68.5 |
| 2012/0175177 A1* | 7/2012 | Lee et al. | 180/68.5 |
| 2013/0277130 A1* | 10/2013 | Katou et al. | 180/68.5 |

FOREIGN PATENT DOCUMENTS

| | | |
|---|---|---|
| JP | 10-255746 A | 9/1998 |
| JP | 2005-112284 | 4/2005 |
| JP | 2005-280649 A | 10/2005 |

\* cited by examiner

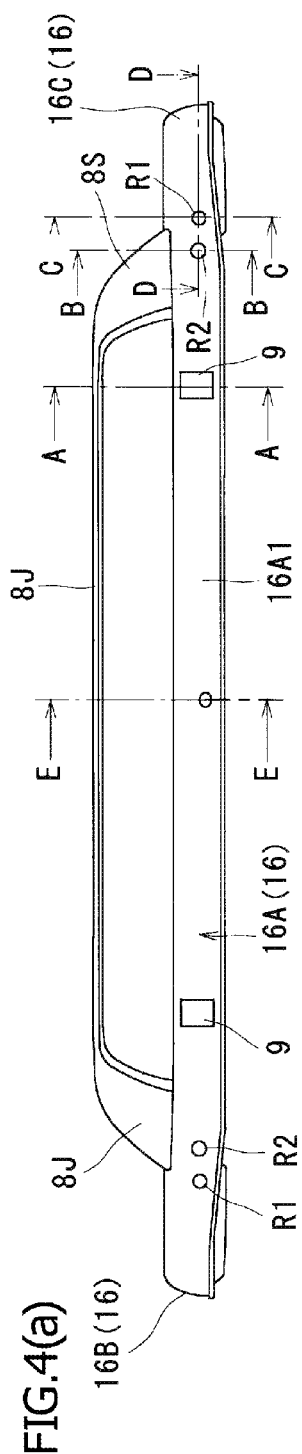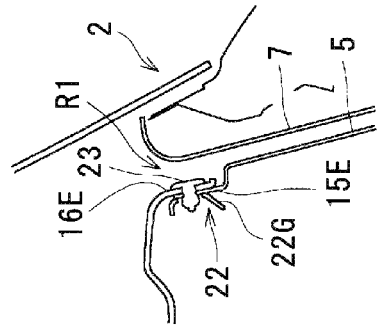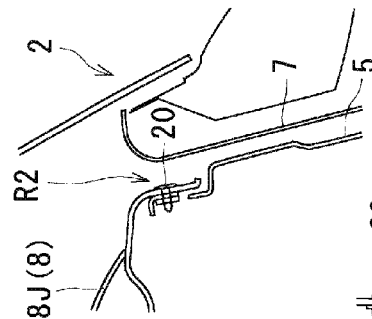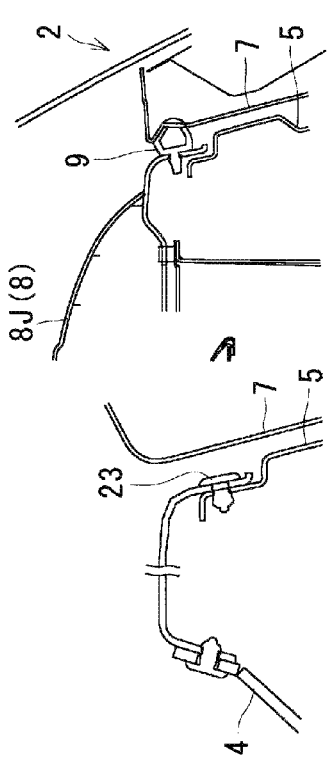

VEHICLE BODY REAR PORTION STRUCTURE

CROSS REFERENCE TO RELATED APPLICATIONS

The present application is a national phase entry under 35 U.S.C. §371 of International Application No. PCT/JP2011/055196, filed Mar. 7, 2011, published in Japanese, which claims priority from Japanese Patent Application No. 2010-120846 filed May 26, 2010, all of which are incorporated herein by reference.

TECHNICAL FIELD

The present invention relates to a vehicle body rear portion structure in which
a battery is mounted on a rear side of a seatback,
a battery cover which covers at least a rear surface of the above battery, is provided,
a parcel shelf which extends rearward on a vehicle from an upper end portion of the above seatback so as to cover an upper side portion of the above battery, is provided, and
a flange which extends downward from a peripheral portion of the above parcel shelf and is coupled to an upper end portion of the above battery cover by a coupling member.

BACKGROUND ART

In a case of vehicles, such as electric cars, and fuel cell vehicles, in which a large battery (an electric battery) must be mounted, a battery is mounted in a portion corresponding to a trunk of an ordinary automobile on a rear side of a seatback of a rear seat as disclosed in, for example, Patent Document 1. Since the battery has high voltage, an upper surface of the battery exposed backward from an upper end of the seatback is covered by a parcel shelf, and a rear surface of the battery exposed in a condition in which a tailgate is opened, is covered by a rear cover as a battery cover, so that passengers cannot easily contact the battery.

Although the parcel shelf has an isolating function for isolating a normally used space from the battery or high-voltage accessories as described above, the parcel shelf is formed with such a plate thickness and of such a material as to obtain a certain level of rigidity, because the parcel shelf is horizontally placed in an entire vehicle width direction, and is supported only by support portions at both ends.

On the other hand, the rear cover, which covers the rear surface of the battery, is formed of a material which is as thin and lightweight as possible, and thereby weight is reduced.

Thus, the conventional rear cover is soft and easily warped as compared to the parcel shelf.

CITATION LIST

Patent Literature

[Patent Document 1] Japanese Patent Publication No. 2005-112284

SUMMARY OF INVENTION

Technical Problem

In the above conventional structure, the rear cover is soft and easily warped as compared to the parcel shelf, so that, for example, when an insertion hole (a coupling member insertion-through hole) of a coupling member (a clip or the like) which is formed in a flange extending downward from a peripheral portion of the parcel shelf, and an insertion hole of the coupling member which is formed in an upper end portion of the rear cover, are misaligned from each other, the upper end portion of the rear cover is pressed by the coupling member and easily warped. As a result, there occurs a problem that the upper end portion of the rear cover moves in a direction to escape from the flange of the parcel shelf, and the coupling member cannot be smoothly inserted into the insertion hole in the upper end portion of the rear cover.

The present invention has been made in view of the aforementioned circumstances, and an object thereof is to provide a vehicle body rear portion structure which can improve the operability of a coupling operation between a flange extending downward from a peripheral portion of a parcel shelf and an upper end portion of a battery cover.

Solution to Problem

The present invention is featured by a vehicle body rear portion structure. The vehicle body rear portion comprises:
a battery mounted on a rear side of a seatback;
a battery cover covering at least a rear surface of the above battery;
a parcel shelf extending rearward on a vehicle from an upper end portion of the above seatback so as to cover an upper side of the above battery; and
a flange extending downward from a peripheral portion of the above parcel shelf and being coupled to an upper end portion of the above battery cover by a coupling member, wherein
a retainer is mounted on the flange of the above parcel shelf at an interval from a flange surface of the above flange, and
the above flange, the upper end portion of the above battery cover, and the retainer are coupled together by the above coupling member while the upper end portion of the battery cover is inserted between the above flange and the retainer. (Claim 1)

With the above configuration, the retainer is mounted on the flange of the above parcel shelf at an interval from the flange surface of the above flange, and the above flange, the upper end portion of the above battery cover, the retainer are coupled together by the above coupling member while the upper end portion of the battery cover is inserted between the above flange and the retainer, the upper end portion of the battery cover thus can be received by the retainer even when the upper end portion of the battery cover is pressed by the coupling member in a coupling operation, and thereby the battery cover can be prevented from being warped in a direction away from (a direction to escape from) the flange of the parcel shelf. Accordingly, the operability of the coupling operation between the flange which extends downward from the peripheral portion of the parcel shelf, and the upper end portion of the battery cover can be improved. (Claim 1)

In the present invention, a following advantage can be obtained.

The above retainer is formed along a corner section of the flange of the above parcel shelf, and is mounted on the above flange,
an end portion in a vehicle width direction of the above battery cover is bent toward a front side portion of the vehicle, and
an upper end portion of a corner section of the above battery cover is inserted between the corner section of the flange of the above parcel shelf and the retainer. (Claim 2)

The above retainer is formed along the corner section of the flange of the above parcel shelf and mounted on the above flange, the upper end portion of the corner section of the above battery cover is inserted between the corner section of the flange of the above parcel shelf and the retainer, the parcel shelf thus can be restricted in front, rear, right, and left directions, and as the parcel shelf only needs to be placed over the upper end portion of the battery cover with respect to a portion other than the corner section of the parcel shelf in the coupling operation, the operability of the coupling operation can be further improved. (Claim 2)

In the present invention, a following advantage can be obtained.

A guide portion guides the upper end portion of the above battery cover between the above flange and the retainer, and is provided in the above retainer. (Claim 3)

The guide portion which guides the upper end portion of the above battery cover between the above flange and the retainer, is provided in the above retainer, and thus, the upper end portion of the above battery cover can be easily inserted between the above flange and the retainer. Accordingly, the operability of the above coupling operation can be further improved. (Claim 3)

In the present invention, a following advantage can be obtained.

A cushion material compressed by a tailgate is provided on a rear end portion of the above parcel shelf. (Claim 4)

The cushion material compressed by the tailgate is provided on the rear end portion of the above parcel shelf, and thus, the impact of an air pressure applied to the battery cover when the gate is closed, can be absorbed by the cushion material. (Claim 4)

Advantageous Effect of Invention

The present invention can provide the vehicle body rear portion structure which can improve the operability of the coupling operation between the flange which extends downward from the peripheral portion of the parcel shelf and the upper end portion of the battery cover.

BRIEF DESCRIPTION OF DRAWINGS

[FIG. 1]

[FIG. 2]

[FIG. 3]

[FIG. 4] FIG. 4(a) is a rear view of the parcel shelf; FIG. 4(b) is a sectional view along E-E of FIG. 4(a) (including a tailgate); FIG. 4(c) is a sectional view along A-A of FIG. 4(a) (including the tailgate); FIG. 4(d) is a sectional view along B-B of FIG. 4(a) (including the tailgate); FIG. 4(e) is a sectional view along C-C of FIG. 4(a) (including the tailgate); and FIG. 4(f) is a sectional view along D-D of FIG. 4(a).

FIG. 5 is a vertical sectional view of the vehicle body rear portion structure.

FIG. 6(a) is a sectional view (a schematic view) illustrating a first attachment method of the parcel shelf; FIG. 6(b) is a sectional view (a schematic view) illustrating a second attachment method of the parcel shelf; and FIG. 6(c) is a perspective view illustrating a support structure of the parcel shelf.

FIG. 7 is a rear view and a top view of the rear cover and a tail end trim.

[FIG. 8]

DESCRIPTION OF EMBODIMENTS

Figure 1A:
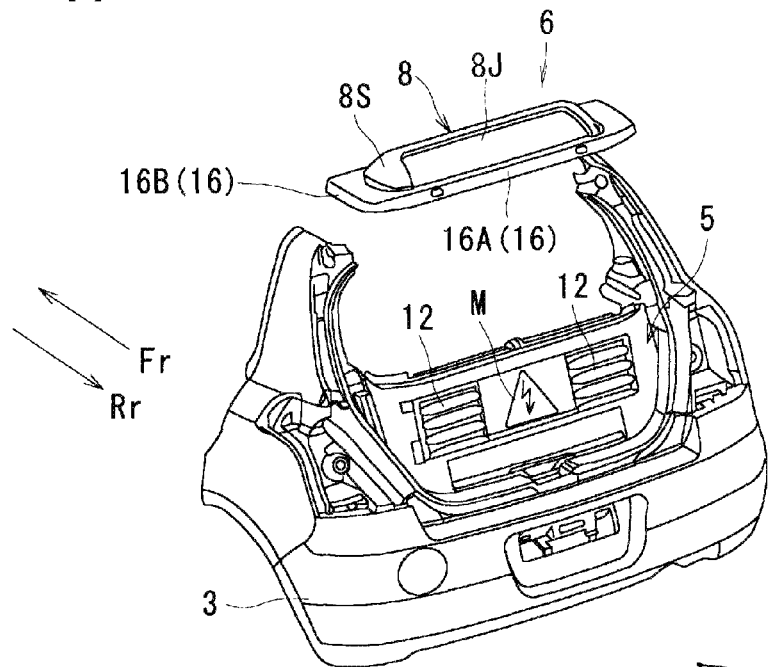
FIG. 1(a) is a perspective view of a vehicle body rear portion structure before a parcel shelf is attached.
Figure 1B:
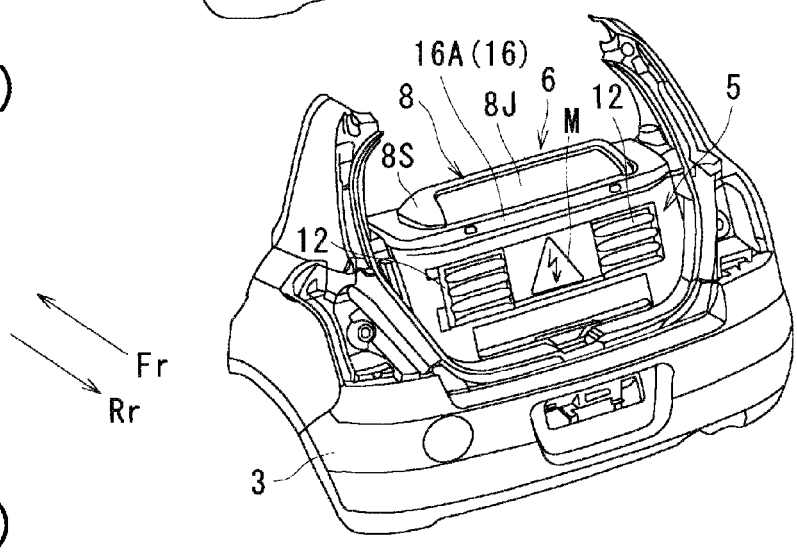
FIG. 1(b) is a perspective view of the vehicle body rear portion structure in a state in which the parcel shelf is attached.
Figure 1C:
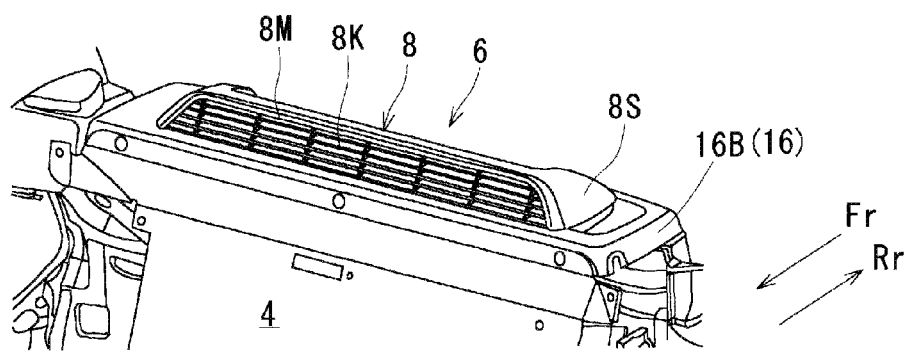
FIG. 1(c) is a perspective view of the parcel shelf as seen from a forward obliquely upward position.
Figure 2A:
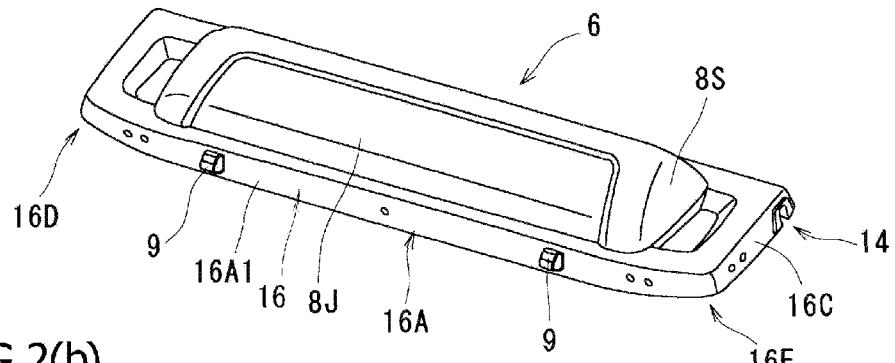
FIG. 2(a) is a perspective view of the parcel shelf as seen from a backward obliquely upward position.
Figure 2B:
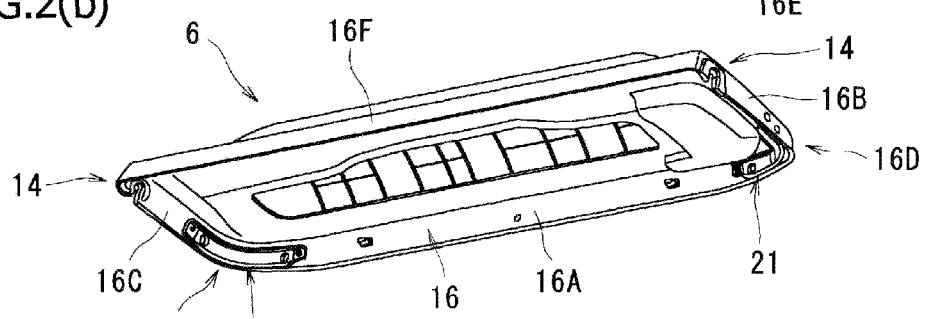
FIG. 2(b) is a perspective view of the parcel shelf as seen from a backward obliquely downward position.
Figure 2C:
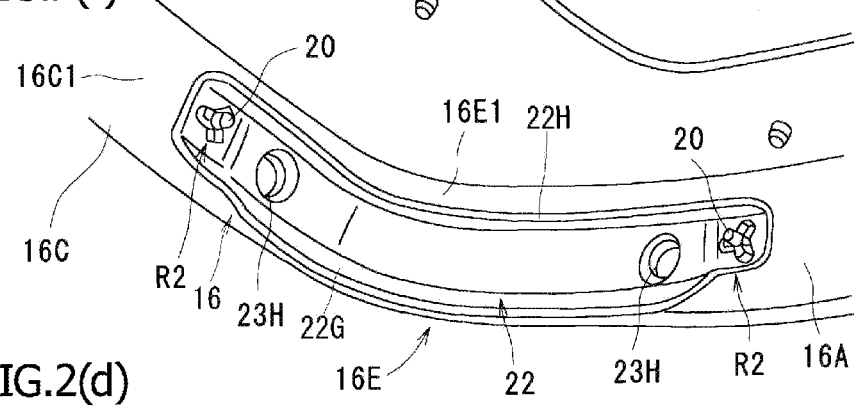
FIG. 2(c) is a perspective view of a right-side corner section of a flange of the parcel shelf.
Figure 2D:
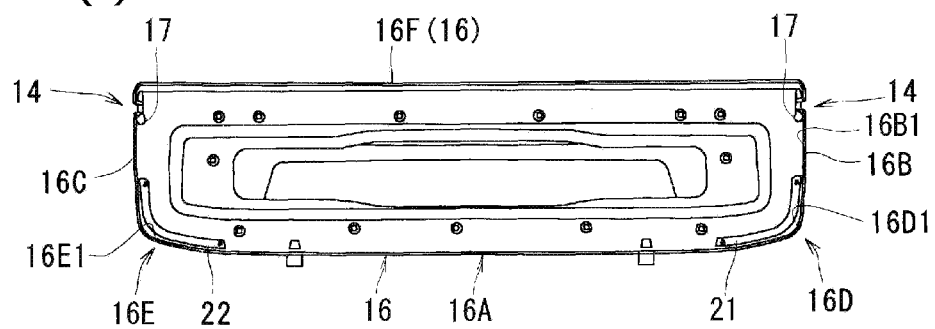
FIG. 2(d) is a bottom view of the parcel shelf.
Figure 3A:
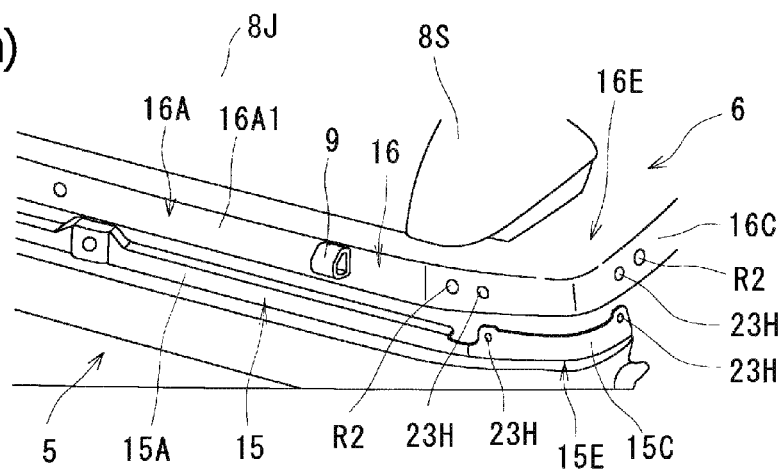
FIG. 3(a) is a perspective view of a state before the parcel shelf and a rear cover are coupled together as seen from a rear side.
Figure 3B:
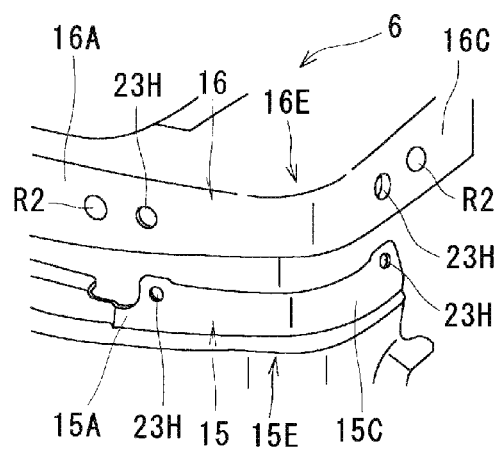
FIG. 3(b) is an enlarged perspective view of the state before the parcel shelf and the rear cover are coupled together as seen from the rear side.
Figure 3C:
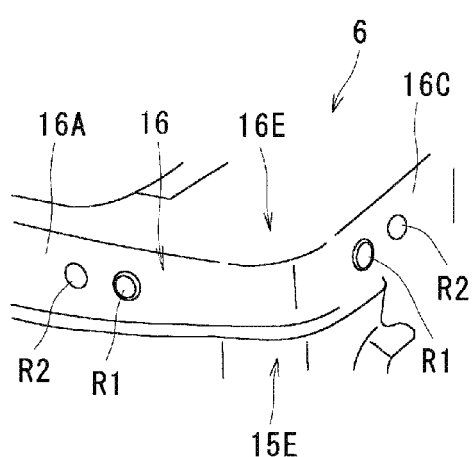
FIG. 3(c) is an enlarged perspective view of a coupling structure (a coupling state) of the parcel shelf and the rear cover.
Figure 3D:
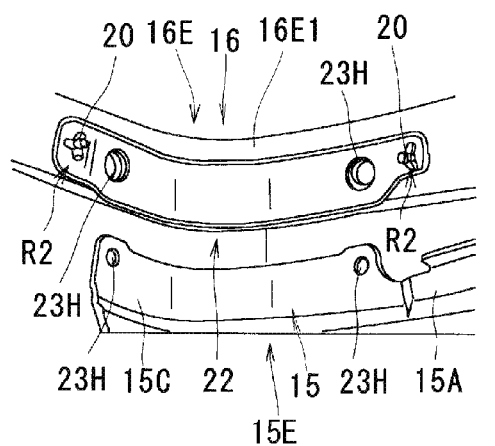
FIG. 3(d) is an enlarged perspective view of the state before the parcel shelf and the rear cover are coupled together as seen from a front lower side.
Figure 3E:
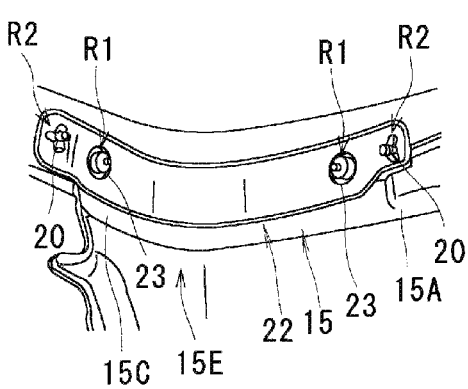
FIG. 3(e) is an enlarged perspective view of the coupling structure (the coupling state) of the parcel shelf and the rear cover as seen from the front lower side.

In the following, an embodiment of the present invention will be described based on the drawings.

FIG. 1(a) to FIG. 1(c), and FIG. 5 show a vehicle body rear portion structure of an electric car. The electric car includes a large battery 1 (an electric battery, see FIG. 5) which is mounted on a floor panel on a rear side of a seatback, and a tailgate 2 which is swingable about a lateral axis O (see FIG. 5) on an upper side to be opened and closed. Reference numeral 3 in FIG. 1(a) denotes a rear bumper.

The above seatback is a part which receives and supports the back of a passenger (a seated person), and, together with a seat cushion which receives and supports the buttocks and thighs of a passenger, constitutes a back seat (a rear seat) of an automobile. The seatback is provided so as to be swingable about a lateral axis on a lower side, and provided so as to be switchable between a standing position and a lying position laid on the seat cushion.

Batteries of electric cars typically are large, and the battery 1 of the electric car in the present embodiment also is large so as to occupy a large area of a trunk space on the rear side of the seatback. In this type of electric car in which the large battery 1 is mounted on the rear side of the seatback, it is necessary to prevent passengers from easily touching the battery 1. Thus, a front cover 4 (see FIG. 1(c)) which covers a front surface of the battery 1 exposed when the seatback is tilted forward; a rear cover 5 (corresponding to a battery cover) which covers a rear surface of the battery 1 exposed when the tailgate 2 is opened; and a parcel shelf 6 which extends to a vehicle rear side Rr from an upper end portion side of the seatback to cover an upper side of the battery 1, are provided in the vehicle body rear portion.

In a case of gasoline vehicles, the rear side of the seatback is used as a trunk space, and the above parcel shelf functions as a horizontal shelf portion from the upper end of the seatback to the tailgate. When the parcel shelf is also attached to a vehicle body, the parcel shelf can be attached only by fitting a fitting concave portion of the parcel shelf to a lateral shaft portion of a quarter trim as an interior material in a vehicle side portion. Furthermore, the parcel shelf is provided so as to be rotatable about the axis of the lateral shaft portion, so that the parcel shelf does not hinder loading and unloading of stuffs in a luggage space because the parcel shelf is rotated about the axis of the lateral shaft portion and thereby erected when objects are loaded or unloaded.

Meanwhile, in the above electric car according to the present invention, the parcel shelf 6 has an isolating function for isolating a normally used space from the battery 1 or high-voltage accessories, and the parcel shelf 6 thus has a structure in which the parcel shelf 6 is not rotated about the lateral axis except when the parcel shelf 6 is attached or subjected to maintenance unlike the parcel shelf of the gasoline vehicle. The parcel shelf 6 is provided with the above isolating function, and both of its surfaces are horizontally supported in a vehicle width direction. Therefore, the parcel shelf 6 is formed with such a plate thickness and of such a material as to obtain a certain level of rigidity, and, for example, is formed of a hard wood stock having a plate thickness of 2.5 mm.

[Parcel Shelf 6 and Support Structure of the Parcel Shelf 6]

Figure 5:
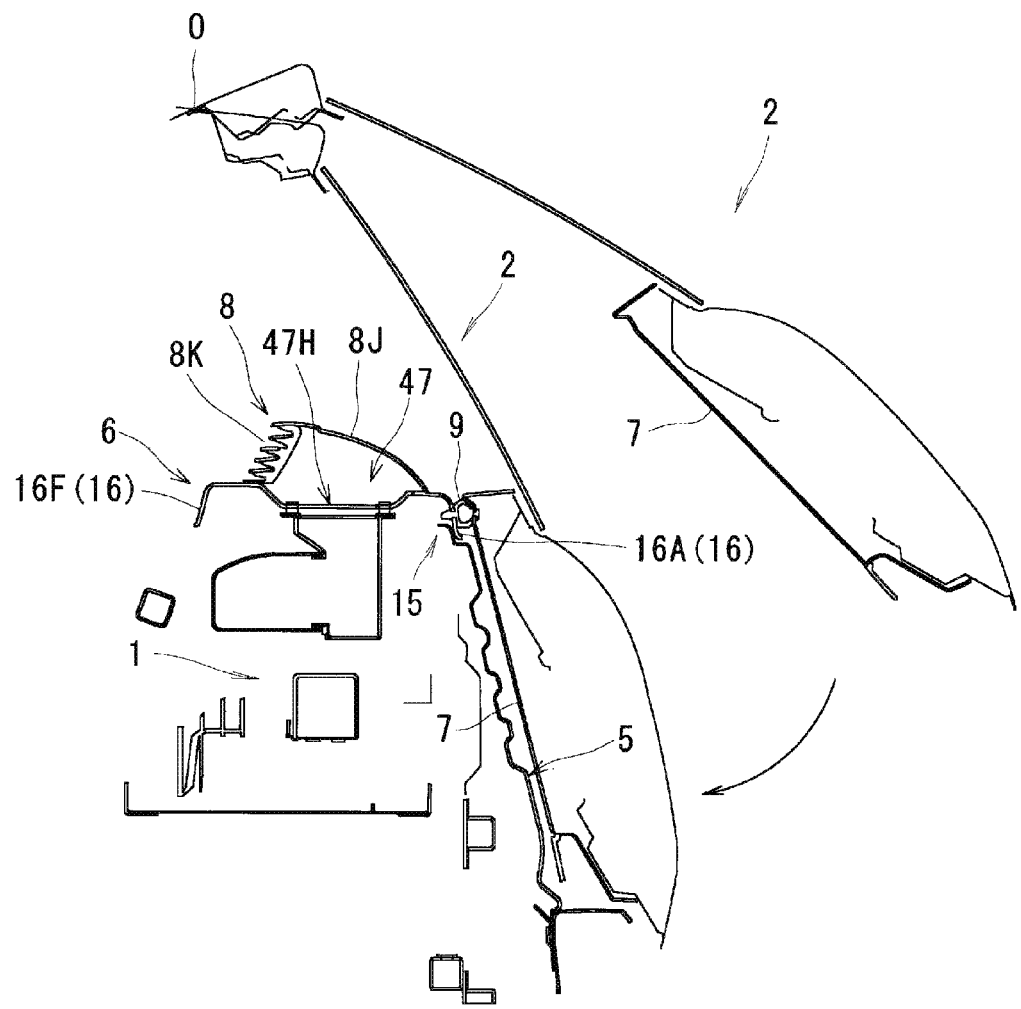
[FIG. 5]

As shown in FIG. 2(*a*) and FIG. 2(*b*), the parcel shelf 6 is formed in a laterally-long rectangular tray shape including a flange 16 which extends downward from an entire peripheral portion, and an intermediate portion in a longitudinal direction and a width direction (a vehicle front and rear direction) is provided as a concave portion 47 (see FIG. 5) which is concaved to the lower side. As shown in FIG. 5, the parcel shelf 6 extends to the vicinity of a tailgate trim 7 of the tailgate 2 from the vicinity of the upper end portion of the seatback in the vehicle front and rear direction.

Figure 6:
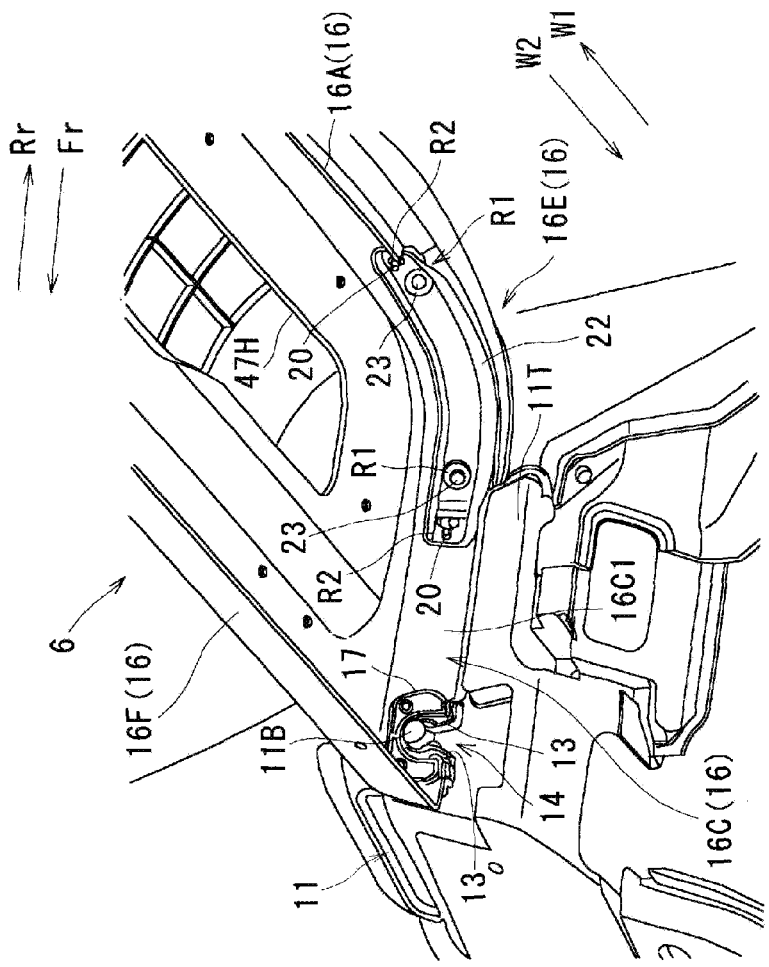
[FIG. 6]

A large vent hole 47H (see FIG. 5 and FIG. 6(*c*)) having a laterally-long rectangular shape is formed in the above concave portion 47. An air intake duct 8 which is laterally long, is also attached to an upper surface of the parcel shelf 6 so as to cover the above vent hole 47H, and is raised from the upper surface of the parcel shelf 6. The air intake duct 8 includes a front wall 8M which is inclined upward to the back, an upper wall 8J having an arc shape in section which extends to the vehicle rear side Rr from an upper end portion of the front wall 8M, and a right and left pair of side walls 8S. A rear end portion of the upper wall 8J is in abutment against the upper surface of the parcel shelf 6 to also function as a rear wall. A grid-shaped air inlet 8K is formed over a substantially entire surface of the above front wall 8M, and air entering from the air inlet 8K cools down the battery 1 through the above vent hole 47H.

A plurality of cushion rubbers 9 (corresponding to a cushion material) compressed by the tailgate trim 7 are provided on a rear surface 16A1 of a rear-side flange 16A (corresponding to a rear end portion of the parcel shelf 6) which is laterally long out of the flange 16 of the parcel shelf 6. The cushion rubbers 9 are formed in a ring shape in section.

As shown in FIG. 6(*c*), a pair of shelf portions 11T which carry and support both right and left end portions of the rear end portion of the parcel shelf 6 set in a horizontal position are separately formed projecting from a right and left pair of quarter trims 11. Lateral shaft portions 11B which project toward a vehicle-width inner side W1, are provided in the right and left pair of quarter trims 11. As shown in FIG. 2(*d*), a bearing portion 14 to which the above lateral shaft portion 11B is relatively rotatably fitted, is provided in a left-side flange 16B of the parcel shelf 6 and a bracket 17 attached to an inner surface 16B1 (a flange surface directed to the vehicle-width inner side W1) of the left-side flange 16B. As shown in FIG. 2(*d*) and FIG. 6(*c*), a bearing portion 14 to which the above lateral shaft portion 11B is relatively rotatably fitted, is provided in a right-side flange 16C of the parcel shelf 6 and a bracket 17 attached to an inner surface 16C1 (a flange surface directed to the vehicle-width inner side W1) of the right-side flange 16C. The bearing portion 14 is formed in a C shape whose lower side is opened, and a lower portion of the bearing portion 14 is also cut away. A pair of guide surfaces 13 which flare downward to guide the lateral shaft portion 11B to the bearing portion 14 extend downward from both open ends of the bearing portion 14.

[Structure of the Rear Cover 5]

The above rear cover 5 which covers the rear surface of the battery 1 is formed of a thin and lightweight material and is thereby reduced in weight, and for example, is formed of a PP (polypropylene) material having a plate thickness of 2 mm.

Since the above battery 1 is large and occupies a large portion of the trunk space on the rear side of the seatback, the rear cover 5 is also set to a length equal to the substantially entire width of the vehicle body rear portion, and the dimension in a vertical direction is set to a length equal to a length from a tail end trim to the parcel shelf 6. Both right and left end portions of the rear cover 5 extend to a vehicle front side Fr to cover both right and left side surfaces of the battery 1 from a vehicle-width outer side W2. As described above, the end portions in the vehicle width direction of the rear cover 5 (the left end portion and the right end portion) are bent toward the vehicle front side Fr.

Both right and left lower end portions of the rear cover 5 are formed in an arc shape which is gently curved as viewed from the vehicle rear side Rr. A large mark M which informs a passenger who empties the tailgate 2 that the battery 1 has high voltage, is formed on a substantially center portion of the rear cover 5. Both outer sides of the mark M of the rear cover 5 are provided as concave-convex portions 12 having a wave shape in vertical section. Accordingly, the rigidity and strength of the rear cover 5 are improved.

As shown in FIG. 3(*a*), FIG. 3(*b*), and FIG. 5, an upper end portion of the rear cover 5 is provided as a flange 15 having an L shape in section, a rear-side flange 15A of the flange 15 projects toward the vehicle front side Fr from a portion below the rear-side flange 15A, and a left-side flange 15B and a right-side flange 15C project toward a vehicle-interior inner side from a portion below the left-side flange 15B or the right-side flange 15C.

Figure 7:
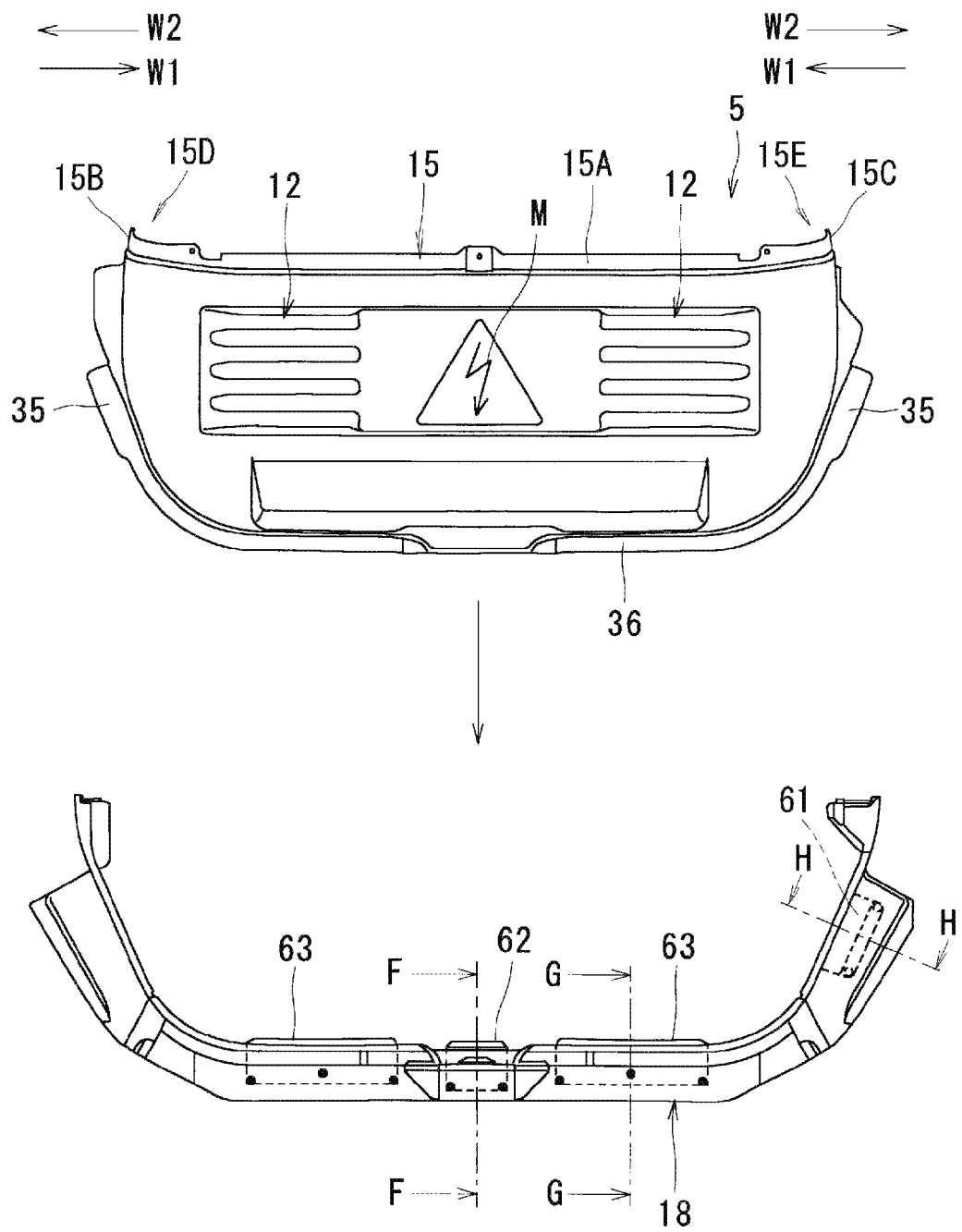
[FIG. 7]
Figure 8A:
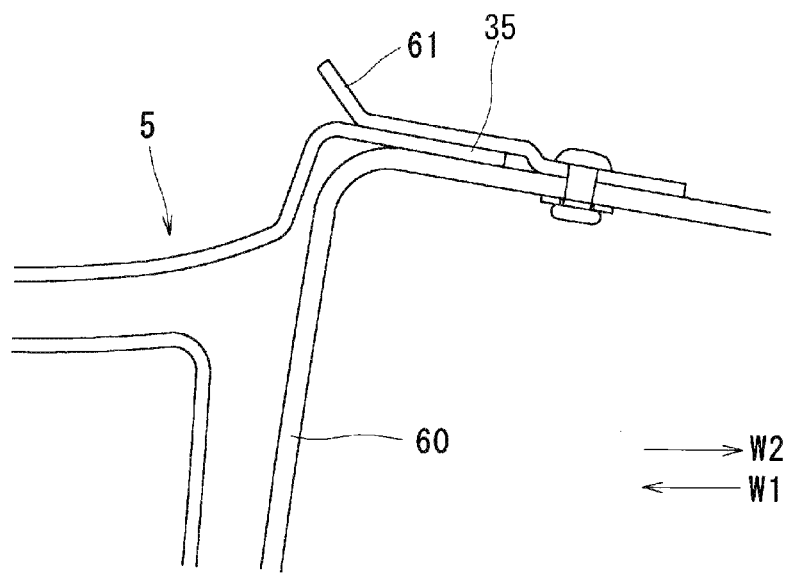
FIG. 8(a) is a sectional view along H-H of FIG. 7.
Figure 8B:
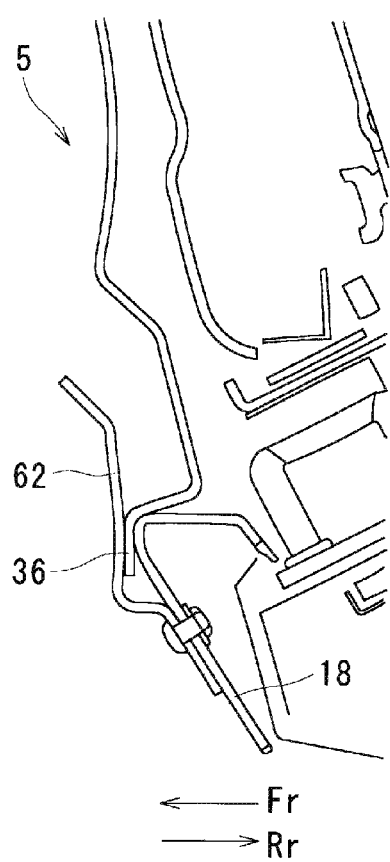
FIG. 8(b) is a sectional view along F-F of FIG. 7.
Figure 8C:
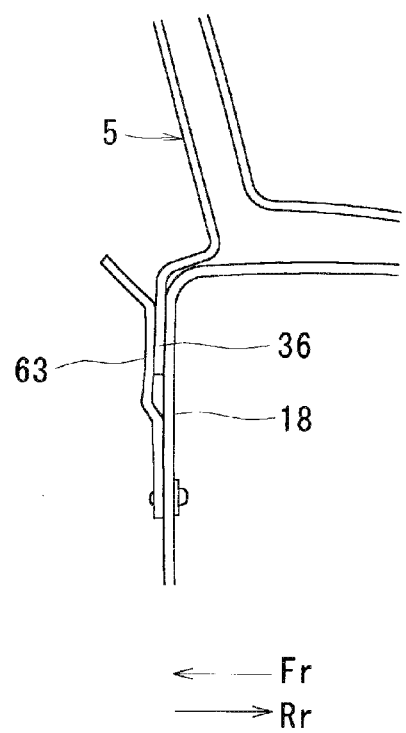
FIG. 8(c) is a sectional view along G-G of FIG. 7.

As shown in FIG. 7, and FIG. 8(*a*) to FIG. 8(*c*), a side portion flange 35 projects toward the vehicle-width outer side W2 from a side portion of the rear cover 5, and the side portion flange 35 is laterally inserted between a quarter trim 60 and a side portion retainer 61 coupled to the quarter trim 60 (see FIG. 8(*a*)). A lower-side flange 36 also projects downward from a lower end portion of the rear cover 5, and a lateral center portion of the lower-side flange 36 is inserted between a tail end trim 18 and a center retainer 62 coupled to the tail end trim 18 (see FIG. 8(*b*)). Furthermore, the lower-side flange 36 (a lower-side flange portion) located on both sides of the lateral center portion of the above lower-side flange 36 is inserted between the tail end trim 18 and a retainer 63 coupled to the tail end trim 18 (see FIG. 8(*c*)).

[Coupling Structure of the Parcel Shelf 6 and the Rear Cover 5]

As shown in FIG. 2(*b*) and FIG. 2(*d*), a band plate-shaped left-side retainer 21 is coupled to an inner surface 16D1 (corresponding to a flange surface) of a left-side corner section 16D formed by the rear-side flange 16A and the left-side flange 16B of the flange 16 of the parcel shelf 6 with a distance (for example, 2 mm) from the inner surface 16D1.

As shown in FIG. 2(*b*), FIG. 2(*c*), and FIG. 2(*d*), a band plate-shaped right-side retainer 22 is coupled to an inner surface 16E1 (corresponding to a flange surface) of a right-side corner section 16E formed by the rear-side flange 16A and the right-side flange 16C of the flange 16 of the parcel shelf 6 at an interval (for example, 2 mm) from the inner surface 16E1. Since the parcel shelf 6 is bilaterally symmetrical, the structure of a right-side end portion of the parcel shelf 6 will be described below.

The right-side retainer 22 is bent along the right-side corner section 16E of the flange 16 of the parcel shelf 6. Furthermore, both longitudinal end portions of the right-side retainer 22 located with a bent point therebetween are respectively fixed to the inner surface 16E1 of the right-side corner section 16E of the flange 16 of the parcel shelf 6 by rivets 20.

As shown in FIG. 3(*a*) to FIG. 3(*e*), a right-side corner section 15E formed by the rear-side flange 15A and the right-side flange 15C of the flange 15 of the rear cover 5 is inserted between the right-side corner section 16E of the flange 16 of the parcel shelf 6 and the right-side retainer 22, and the right-side corner section 16E of the flange 16 of the parcel shelf 6, the right-side corner section 15E of the flange 15 of the rear cover 5, and the right-side retainer 22 are coupled together by a pair of clips 23 (corresponding to a coupling member). A pair of clip insertion-through holes 23H (see FIG. 2(*c*) and FIG. 3(*a*) to FIG. 3(*d*)) is formed in the right-side corner section 15E of the flange 15 of the rear cover 5, and the right-side retainer 22.

As shown in FIG. 3(*d*) and FIG. 6(*c*), in the right-side corner section 16E of the flange 16 of the above parcel shelf 6, coupling portions R1 by the above pair of clips 23 are located between fixing portions R2 by the pair of rivets 20, a coupling portion R1 by one of the clips 23 is located adjacent to a fixing portion R2 by one of the rivets 20, and a coupling portion R1 by the other clip 23 is located adjacent to a fixing portion R2 by the other rivet 20. Accordingly, the right-side retainer 22 becomes difficult to deform even when pressed by the clips 23, so that a load on the right-side retainer 22 can be reduced.

A guide portion 22G (see FIG. 2(*c*) and FIG. 4(*e*)) which guides the right-side corner section 15E of the flange 15 of the above rear cover 5 between the right-side corner section 16E of the flange 16 of the parcel shelf 6 and the right-side retainer 22 is provided in the right-side retainer 22. The guide portion 22G is provided to be inclined such that an upper end portion of the right-side retainer 22 is located on a radially outermost side of the parcel shelf 6 on the uppermost side. The upper end portion of the right-side retainer 22 is bent toward an inner side of the right-side retainer 22 and thereby provided as a flange 22H. Accordingly, the strength of the left-side retainer 22 can be increased.

A procedure for attaching the parcel shelf 6 is shown in schematic views of FIG. 6(*a*) and FIG. 6(*b*). The parcel shelf 6 can be attached by attachment methods as in (1) and (2) described below.

(1) As shown in FIG. 6(*a*), the parcel shelf 6 is lowered from directly above the battery 1,
(1a) the bearing portions 14 (see FIG. 6(*c*)) of the parcel shelf 6 are fitted to the lateral shaft portions 11B of the quarter trims 11 from above, and
(1b) a left-side corner section 15D of the flange 15 of the rear cover 5 is inserted between the left-side corner section 16D of the flange 16 of the parcel shelf 6 and the left-side retainer 21, and the right-side corner section 15E of the flange 15 of the rear cover 5 is inserted between the right-side corner section 16E of the flange 16 of the parcel shelf 6 and the right-side retainer 22.

In this case, the above (1a) and (1b) are performed at the same time.

(2) As shown in FIG. 6(*b*),
(2a) the bearing portions 14 of the parcel shelf 6 are fitted to the lateral shaft portions 11B of the quarter trims 11 from the vehicle front side Fr (or a front upper side), and (2b) the left-side corner section 16D of the flange 16 of the rear cover 5 is inserted between the left-side corner section 16D of the flange 16 of the parcel shelf 6 and the left-side retainer 21, and the right-side corner section 15E of the flange 15 of the rear cover 5 is inserted between the right-side corner section 16E of the flange 16 of the parcel shelf 6 and the right-side retainer 22 by rotating the parcel shelf 6 toward the vehicle rear side Rr about the axis of the lateral shaft portions 11B.

With the present invention,
the flange 15 of the rear cover 5 can be received by the left-side retainer 21 and the right-side retainer 22 even when the flange 15 of the rear cover 5 is pressed by the clips 23 in a coupling operation, so that the rear cover 5 can be prevented from being warped in a direction to escape from the flange 16 of the parcel shelf 6. Accordingly, the operability of the coupling operation can be improved.

FIG. 5 shows a vertical sectional side view illustrating an operation of opening and closing the tailgate 2. The rear cover 5 covers an entire surface of an open portion of the trunk on the lower side of the parcel shelf 6, and a clearance with the tailgate 2 is set to be small (for example, 8 mm). In addition to that the rear cover 5 is fixed to the parcel shelf 6 only by the clips 23 and, in another position, is only supported by the retainers (21, 22, 61, 62, and 63) and not fixed, there is a small air escape path when the gate is closed as the rear cover 5 has a large area, so that a substantial air pressure is applied. With the present invention, since the plurality of cushion rubbers 9 compressed by the tailgate trim 7 are provided on the rear surface of the rear-side flange 16A of the flange 16 of the parcel shelf 6, the impact of the air pressure can be absorbed by the cushion rubbers 9 provided on the parcel shelf 6. As described above, the advantage is also obtained by fixing the upper end portion of the rear cover 5 to the rear end portion of the parcel shelf 6 when the gate is opened and closed.

Since the above guide portion 22G is provided in the right-side retainer 22, the right-side corner section 15E of the flange 15 of the rear cover 5 can be easily inserted between the right-side corner section 16E of the flange 16 of the parcel shelf 6 and the right-side retainer 22.

OTHER EMBODIMENTS (1) The above retainer may be provided at the center of the rear surface of the flange 16 of the parcel shelf 6 in addition to the left-side corner section 16D or the right-side corner section 16E of the flange 16 of the parcel shelf 6.
(2) While it is not necessary to consider the appearance of the above front cover 4 as compared to the rear cover 5 and the front cover 4 may be fastened from the upper side of the parcel shelf 6 with the front cover 4 being on the upper side since the front cover 4 is hidden on a reverse side of the rear seat, the appearance may be further improved by providing a retainer as in the rear cover 5.

REFERENCE SIGNS LIST

1 Battery
5 Battery cover (rear cover)
6 Parcel shelf
9 Cushion material (cushion rubber)
15 Flange (flange of the rear cover, the upper end portion of the battery cover)
15D Corner section (left-side corner section of the flange of the rear cover)
15E Corner section (right-side corner section of the flange of the rear cover)

16 Flange (flange of the parcel shelf)
16A Rear end portion of the parcel shelf (rear-side flange)
16D Corner section (left-side corner section of the flange of the parcel shelf)
16E Corner section (right-side corner section of the flange of the parcel shelf)
16D1 Flange surface
16E1 Flange surface
21 Retainer (left-side retainer)
22 Retainer (right-side retainer)
22G Guide portion (guide portion of the right-side retainer)
23 Coupling member (clip)
Fr Vehicle front side
Rr Vehicle rear side

The invention claimed is:

1. A vehicle body rear portion structure comprising:
a battery mounted on a rear side portion of a seatback;
a battery cover covering at least a rear surface of the battery;
a parcel shelf extending rearward on a vehicle from an upper end portion of the seatback so as to cover an upper side portion of the battery; and
a flange extending downward from a peripheral portion of the parcel shelf, and being coupled to an upper end portion of the battery cover by a coupling member, wherein
a retainer is mounted on the flange of the parcel shelf at an interval from a flange surface of the flange, and
the flange, the upper end portion of the battery cover, and the retainer are coupled together by the coupling member while the upper end portion of the battery cover is inserted between the flange and the retainer.

2. The vehicle body rear portion structure according to claim 1, wherein
the retainer is formed along a corner section of the flange of the parcel shelf, and is mounted on the flange,
an end portion, in a vehicle width direction, of the battery cover is bent toward a front side portion of the vehicle, and
an upper end portion of a corner section of the battery cover is inserted between the corner section of the flange of the parcel shelf and the retainer.

3. The vehicle body rear portion structure according to claim 1, wherein
a guide portion guides the upper end portion of the battery cover between the flange and the retainer, and is provided in the retainer.

4. The vehicle body rear portion structure according to claim 2, wherein a guide portion guides the upper end portion of the battery cover between the flange and the retainer, and is provided in the retainer.

5. The vehicle body rear portion structure according to claim 1, wherein a cushion material compressed by a tailgate is provided on a rear end portion of the parcel shelf.

6. The vehicle body rear portion structure according to claim 2, wherein a cushion material compressed by a tailgate is provided on a rear end portion of the parcel shelf.

7. The vehicle body rear portion structure according to claim 3, wherein a cushion material compressed by a tailgate is provided on a rear end portion of the parcel shelf.

8. The vehicle body rear portion structure according to claim 4, wherein a cushion material compressed by a tailgate is provided on a rear end portion of the parcel shelf.

* * * * *